June 15, 1926.

A. L. PUTNAM 1,588,495

METHOD OF CONSTRUCTING METAL SPOKE WHEELS

Filed June 12, 1924

INVENTOR
Alden L. Putnam
BY Clark C. Wood
ATTORNEY

Patented June 15, 1926.

1,588,495

UNITED STATES PATENT OFFICE.

ALDEN L. PUTNAM, OF LANSING, MICHIGAN, ASSIGNOR TO MOTOR WHEEL CORPORATION, OF LANSING, MICHIGAN.

METHOD OF CONSTRUCTING METAL-SPOKE WHEELS.

Application filed June 12, 1924. Serial No. 719,505.

My invention relates to the construction of vehicle wheels in which the spider is composed of flat metal spokes, and its purposes are to supply a means by which the spider can be more conveniently assembled and when assembled shall have the spokes securely locked in position.

Figure 1:
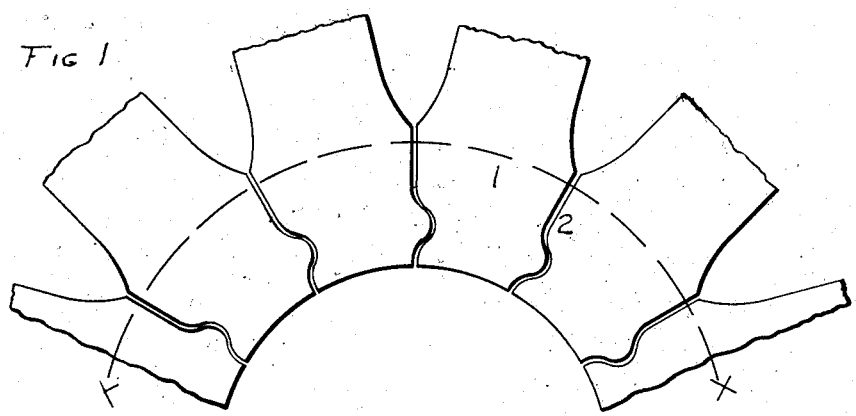
Figure 2:
Figure 3:
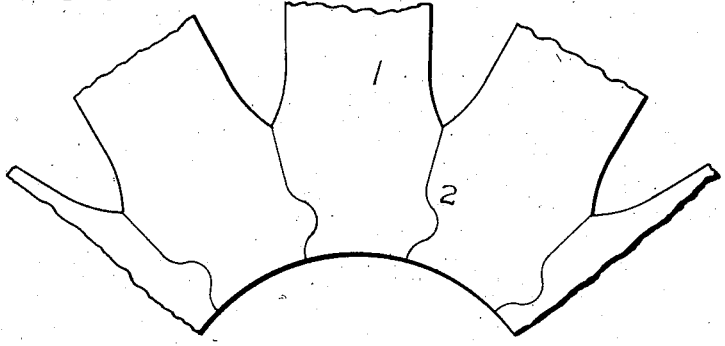

I attain these purposes by the means shown in the accompanying drawings in which Fig. 1 shows a plan view of a portion of a spider composed of spokes having their hub ends formed in a modification of my application No. 639,776, as assembled together ready for the press. Fig. 2 is a partial cross section on the line x—x of Fig. 1. Fig. 3 is a plan view showing the operation completed and the spokes locked together.

While in the use of my invention I prefer to employ spokes of a type shown in the above mentioned application or some modification thereof, it may be applied to almost any construction of flat metal spokes adapted to be locked together at the hub ends.

In the construction of wheels under my application No. 639,776 I have discovered that with the most accurate possible construction of the spokes it is difficult to secure the close fit of the spokes together necessary to form a sufficiently rigid spider and my invention is intended to remedy this difficulty.

My invention consists in constructing the hub ends of the spokes 1, with a slight transverse curve as shown in Fig. 2. The locking device 2 is preferably constructed of substantially the form shown in Fig. 1 but may be of any approved shape. The effect of the transverse curve is to slightly narrow the spokes, since the chord of the arc is shorter than its circumference. By this construction when the spokes are arranged in spider formation there is a loose fitting relation between the spokes as emphasized in Figures 1 and 2, and in this condition pressure is applied to the hub end portions of the spokes to flatten out the transverse curvature thereof thus pressing the spokes close together and locking them securely in position as illustrated in Figure 3 of the drawings. In practicing the invention the spider is advantageously placed inside the wheel felly and then placed in a wheel press and pressure applied to effect the flattening out of the hub end portions of the spokes and the forcing of the same close together.

I claim as my invention and desire to secure by Letters Patent:—

1. A process for facilitating the assembling of metal vehicle wheels composed of flattened metal spokes, which consists in forming the hub ends of said spokes curved in such manner that the chord of the arc shall extend circumferentially of the wheel, assembling the spokes into a complete spider, and pressing out the curve by any suitable process.

2. A process for facilitating the assembling of metal vehicle wheels composed of flattened metal spokes, which consists in forming the hub ends of said spokes curved in such manner that the chord of the arc shall extend circumferentially of the wheel, and providing said hub ends with co-engaging projections and notches, assembling the spokes into a complete spider, and pressing out the curve by any suitable process.

3. The method of assembling vehicle wheels having metal spokes with hub end portions of greater width than thickness consisting in forming the hub end portions of the spokes with a transverse bend to temporarily lessen the width of the spokes, assembling the spokes in spider formation, and applying pressure to the hub end portions of the spokes to flatten the same.

4. The method of assembling vehicle wheels having metal spokes with hub end portions of greater width than thickness consisting in forming the hub end portions of the spokes with a transverse bend to temporarily lessen the width of the spokes and providing the hub end portions with portions adapted to interfit one with the other, assembling the spokes in spider formation, and applying pressure to the hub end portions of the spokes to flatten the same.

ALDEN L. PUTNAM.